Nov. 1, 1927.

H. C. MILLER

AUXILIARY LOCOMOTIVE

Filed May 25, 1925

1,647,460

INVENTOR.

Henry C. Miller

BY

ATTORNEYS.

Patented Nov. 1, 1927.

1,647,460

UNITED STATES PATENT OFFICE.

HENRY C. MILLER, OF WATERFORD, NEW YORK.

AUXILIARY LOCOMOTIVE.

Application filed May 25, 1925. Serial No. 32,772.

This invention is directed to improvements in auxiliary locomotives or boosters.

In auxiliary locomotives of this type, various means have been heretofore proposed, through which mechanical connection between the driving element of the booster and the driven element of the truck or like part may be perfected at will, but such interconnecting means, which is usually bodily movable to and from an operative position, tends to reduce the effective power of the booster, complicate the mechanism and increase the wear of the necessary parts.

It is the principal object of the present invention to dispense with an auxiliary movable part which may be operated at will as the interposed connecting element between the booster and driven part, and to provide a means which is always in operative relation to the driven or truck part, and which at will may be clutched for operative actuation by the booster, whereby the minimum number of driving parts are employed, the driving relation of these parts is at all times uniform and exact, and the operator may insure a utilization of the maximum power of the booster.

A further object of the invention is the provision of a clutch mechanism through which the driving element of the booster, which is normally inactive, becomes active as a direct drive, with the operation of the clutch element subject to initial manual control, but operative both in clutching and unclutching through the actuation of the booster.

The invention is illustrated in the accompanying drawings, in which.

Figure 1:
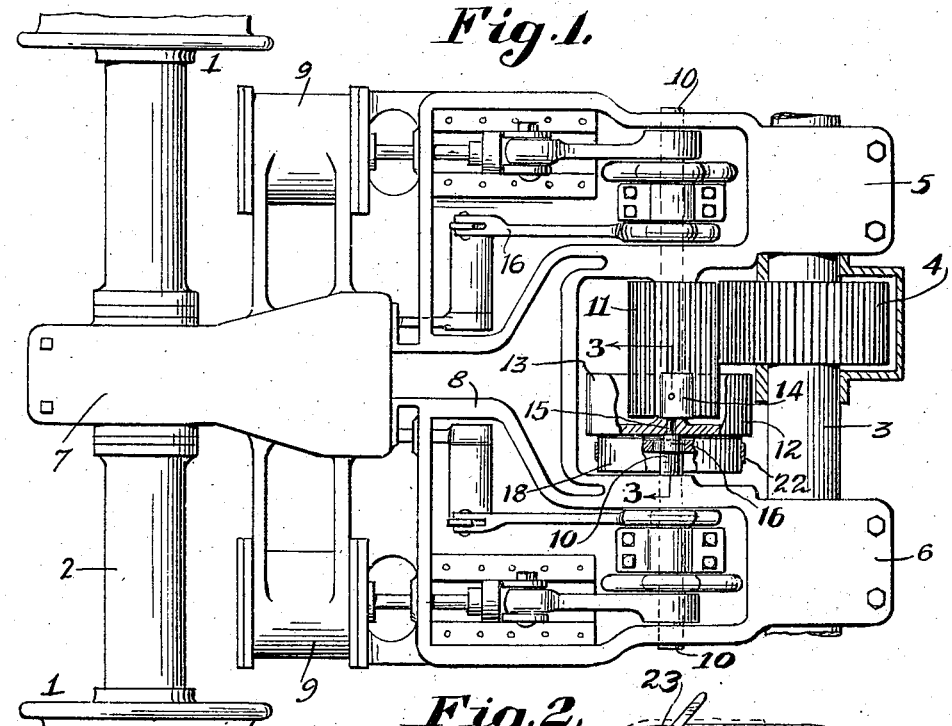
Fig. 1 is a plan view, partly broken away, of the improved booster.
Figure 2:
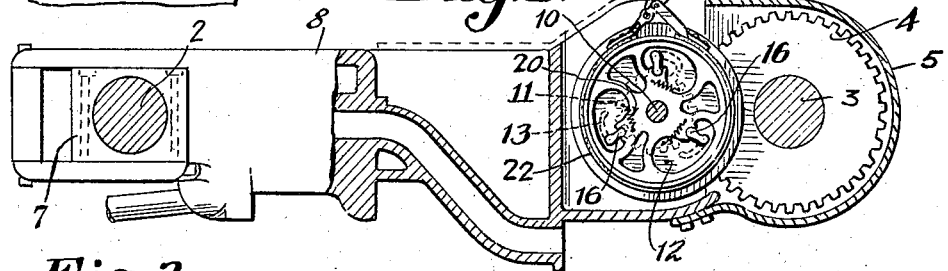
Fig. 2 is a longitudinal central section of the same.
Figure 3:
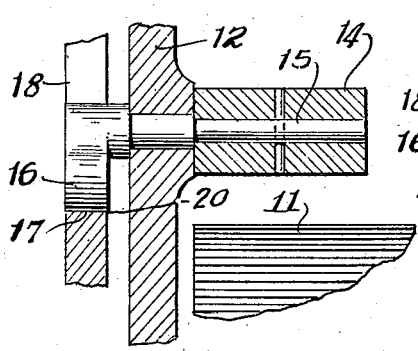
Fig. 3 is a broken sectional view on line 3—3 of Fig. 1.
Figure 4:
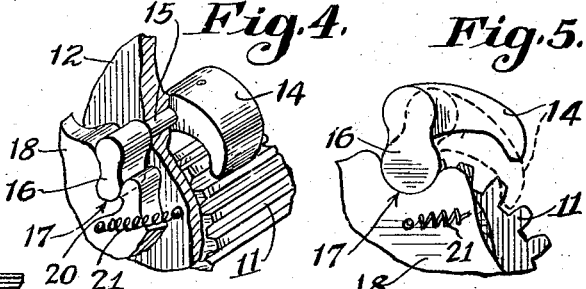
Fig. 4 is a broken perspective view illustrating the mounting of the dogs and their operating means, a single dog only being shown.
Figure 5:
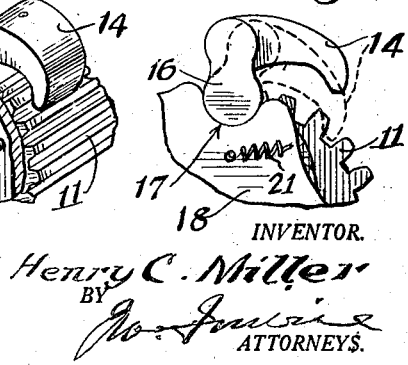
Fig. 5 is a side elevation of one of the dogs and its operating means, the dog being shown in normal or inoperative position in full lines, and in operative position in dotted lines.

In the drawings, 1 indicates a booster truck, of which 2 and 3 indicate the front and rear axles. As the booster proper, aside from the details hereinafter specifically referred to, forms no part of the present invention, the drawing illustrates a portion only of such booster, it being understood that any conventional or desired construction of booster may be employed.

One of the axles, as 2, is for the purpose of the present invention provided with a relatively fixed gear wheel 4, hereinafter termed the driven member, and suitably supported on the truck, as by bearings 5, 6, and 7, is a motor frame 8, having motors 9, provided with operating crank connections with a power shaft 10. On the shaft 10 is loosely mounted a pinion 11 which is designed to be at all times in mesh with the gear wheel 4, with such pinion constituting what will hereinafter be termed the driving member. The pinion has an axial length greater than that of the gear 4, so that the pinion is disposed or projects beyond the gear at one side.

Secured upon the power shaft 10, is a disc wheel 12, the edge flange 13 of which overlies the projecting portion of the pinion 11. Pivotally supported in the disc wheel beyond and in line with the projecting portion of the pinion 11, are a series of dogs or pawls 14, which are so mounted and formed that in operative position they will engage with the teeth of the pinion 11 and lock said pinion with relation to the disc 12, with the effect to fix the pinion with relation to the power shaft 10. The studs 15 on which the pawls 14 are supported extend through the disc 12, and beyond said disc relative to the pinion 11, such studs are provided with arms 16 having rounded cam terminals 17. The pawls, studs, and arms, form an integral unit which is supported for swinging movement in the disc wheel 12, so that through movement of the arms 16, the pawls may be moved into or out of engagement with pinion 11.

The operating member for the pawls is provided in an operating wheel 18 mounted loosely on the power shaft and having a peripheral surface 19 of appreciable width. This operating wheel which is preferably of skeleton outline, is formed at appropriate points with a series of cam depressions 20, in which the cam ends 17 of the arms 16 are at all times seated. The operating wheel 18 is, as stated, loose upon the shaft 10, but is connected for normal uniform rotative movement with the disc wheel 12, through the medium of coil springs 21, terminally connected to the disc wheel and to the operating wheel, and tensioned to normally hold the operating wheel in such relation to the disc wheel that the arms 16 of the pawls 14 will be held by the cam depressions to maintain the pawls 14 out of engagement with the pinion 11.

Under these conditions, the pinion 11 is wholly free of any connection with the booster operating shaft 10, and hence the booster is without driving effect upon the gear wheel 4, notwithstanding the fact that the pinion 11 and gear wheel 4 are constantly in operating mesh.

The operating wheel is designed to be manually controlled through the medium of a brake band 22, overlying the peripheral surface 19 of such wheel, with the terminals of such band connected in any appropriate manner to an operating means, whereby the band may be temporarily tightened about the operating wheel. For the purpose of illustration, such means is shown as a lever 23, though any appropriate means are contemplated for this purpose. Under the action of the manually operable means provided, the band is tightened about the periphery of the operating wheel, and the motion of the latter is slightly retarded, the springs 21 yielding to permit this relative movement of the operating wheel and disc wheel. Under this relative movement, the cam depressions 20 move the arms 16 of the pawl units, and thereby move the pawls 14, into cooperation with the extended portion of the pinion 11. The pinion is thereby fixed with relation to the operating shaft and, the booster motors being in operation, the power of the booster is communicated to the driven element or gear 4.

As the driving action is through the pawls 14, the latter will remain in engagement with the pinion 11 as long as the latter is exerting power upon the gear 4, but when the pinion 11 fails as a power transferring element, as when the gear 4 is driven by the tractive power of the truck on the rails at a speed exceeding that of the pinion 11, the working pressure of such pinion is relieved, the pawls are more or less freed and the springs 21 act to return the operating wheel to normal relation with the disc wheel 12, thereby disconnecting the pinion 11 from the power shaft 10.

From the above it will be apparent that the invention in its broadest aspect is directed to means employed to connect and disconnect the motors of the booster from the driven element thereof. The invention is thus to be distinguished from the heretofore proposed constructions of utilizing intermediate normally idle gears adapted to be bodily moved to and from an operative relation between the driving elements of the booster and the driven element thereof, in that the present invention utilizes a clutch for a normally idle gear which is at all times in operative mesh with the driven element, which clutch is operative at will to interlock the normally idle gear with the power element of the booster without in any way disturbing the relation of that gear with the booster elements or with the driven element. This permits an unusually strong construction, proper driving mesh of the gears, and direct power transmission, and avoids liability of breakage and undue strain and wear on the working parts.

Obviously, without material change other than positioning the parts, the clutch mechanism herein described could be applied to the driven gear 4, in which event, the driving pinion 11 would be at all times fixed on the power shaft 10.

I claim:

1. A locomotive booster including a power train having a power shaft, an element normally idle thereon, and a driving member at all times in operative connection with the idle element, and a clutch governing the introduction of said idle element as a driving member in the power train, said clutch being automatically released to render said element idle under predetermined power train conditions.

2. A locomotive booster including a power train having a power shaft, a gear normally idle thereon, a driven gear at all times in mesh with the idle gear, and a manually controlled clutch for positively locking said gear as an element of the power train, said clutch automatically releasing said gear as an element of the power train under predetermined power train conditions.

3. A locomotive booster, including a power train comprising a booster driven power shaft, a driven element, and an intermediate gear normally loose on the power shaft, and a manually controlled clutch for locking said gear to the power shaft to complete the power train between such shaft and driven element, said clutch automatically releasing said gear as an element of the power train under predetermined power train conditions.

4. A locomotive booster, including a power train having a booster driven power shaft, a gear normally idle thereon, and a driven gear at all times in mesh with said idle gear, a plurality of pawls for connecting the idle gear to the power shaft, a member flexibly driven by the power shaft for controlling the position of the pawls, and means for controlling the member to induce movement of the pawls to lock said idle gear to the power shaft.

5. A locomotive booster, including a power train having a booster driven power shaft, a gear normally idle thereon, and a driven gear at all times in mesh with said idle gear, a plurality of pawls for connecting the idle gear to the power shaft, a member flexibly driven by the power shaft for controlling the position of the pawls, and means for controlling the member to induce movement of the pawls to lock said idle gear to the power shaft, the driving pressure of the power train maintaining the operative connection of the pawls and idle gear during the continuation of such driving pressure.

6. A locomotive booster, comprising a truck frame and axle, a gear wheel on the axle, a motor mounted on the truck frame including a loose pinion, and means for manually connecting and automatically disconnecting the loose pinion with the motor.

7. A locomotive booster, comprising a truck frame and axle, a gear wheel on the axle, a motor mounted on the truck frame including a loose pinion, means for connecting the loose pinion with the motor, and automatic means for disconnecting the loose pinion from the motor when the speed of the axle exceeds the speed of the motor.

8. In a locomotive booster a power train having a normally idle gear, clutching means controlled by manually inaugurated frictional resistance serving under booster power to cause the idle gear to become a positive driving element, and means for automatically disconnecting the clutch to permit said gear to again become idle when power is cut off from the booster.

9. A locomotive booster, comprising a truck frame and axle, a motor mounted on the truck frame, a gear fixed on the axle, a clutch for connecting the motor to the gear, and means for automatically disconnecting the clutch when the speed of the axle exceeds the speed of the motor.

In testimony whereof I affix my signature.

HENRY C. MILLER.